United States Patent [19]

Greveling

[11] Patent Number: 4,875,757
[45] Date of Patent: Oct. 24, 1989

[54] OPTICAL CABLE

[75] Inventor: Johannes Greveling, Saskatoon, Canada

[73] Assignee: Northern Telecom Limited, Montreal, Canada

[21] Appl. No.: 196,525

[22] Filed: May 20, 1988

Related U.S. Application Data

[63] Continuation-in-part of Ser. No. 877,064, Jun. 23, 1986, Pat. No. 4,763,982.

[51] Int. Cl.$^4$ .............................................. G02B 6/44
[52] U.S. Cl. .................................................. 350/96.23
[58] Field of Search ....................................... 350/96.23

[56] References Cited

U.S. PATENT DOCUMENTS

| 4,367,917 | 1/1983 | Gray ................................. | 350/96.23 |
| 4,372,792 | 2/1983 | Dey et al. ........................ | 350/96.23 |
| 4,629,286 | 12/1986 | Fuse et al. ...................... | 350/96.23 |
| 4,763,982 | 8/1988 | Greveling ........................ | 350/96.23 |

FOREIGN PATENT DOCUMENTS

| 0108813 | 6/1985 | Japan ................................. | 350/96.23 |
| 0002111 | 1/1986 | Japan ................................. | 350/96.23 |
| 1217011 | 9/1986 | Japan ................................. | 350/96.23 |
| 2078996 | 1/1982 | United Kingdom ............. | 350/96.23 |

Primary Examiner—William L. Sikes
Assistant Examiner—Akm E. Ullah
Attorney, Agent, or Firm—R. J. Austin

[57] ABSTRACT

An optical cable having at least one optical fiber in its core, the fiber surrounded by a fiberglass tube. The fiber is loosely contained within the tube which comprises a matrix of glass filaments with gaps between filaments filled by a rigid material such as an epoxy resin. A water blocking medium may fill the tube.

6 Claims, 2 Drawing Sheets

OPTICAL CABLE

This application is a continuation-in-part of U.S. application Ser. No. 877,064, filed June 23, 1986 now U.S. Pat. No. 4,763,982.

This invention relates to optical cable.

Optical cables have certain common elements. These include at least one optical fiber for transmission purposes, means for protecting the fiber from damage, and a jacket which provides the outer layer of the cable.

In some cable structures, optical fibers are housed in grooves formed in the outer surface of a central support member, the grooves extending around the member either helically in one direction or alternately, in each direction around the member.

In other cable structures, an optical fiber or fibers is housed within a plastic tube located coaxially of the cable. These tubes are normally provided for the sole purpose of forming a passage for the fibers and any protection to prevent crushing of the cable and thus of the fibers is provided by a compression resistant shield which surrounds the fiber carrying tube.

In a proposed structure related to a cable, an optical fiber has a reinforced plastic coating surrounding it. This is described in a paper entitled "New Applications of Pultrusion Technology RP Covered Optical Fiber" by K. Fuse and Y. Shirasaka and read before the 40th Annual Conference in January 1985 of Reinforced Plastics/Composites Institute, The Society of the Plastics Industry Inc. As described in that paper, an optical fiber is surrounded by a buffer material and then enclosed within a tube of reinforced plastics by a manufacturing process referred to as pultrusion. In this process, reinforcing fibers are coated with a resin and the coated fibers and the pre-buffered optical fiber are passed through a die with the optical fiber located centrally so that the resin on the reinforcing fibers merges to form the plastic coating.

According to the present invention, an optical cable is provided having a core and a jacket, the core comprising at least on optical fiber and a protective tube immediately surrounding and housing the optical fiber, the tube having an inner diameter greater than the diameter of the fiber whereby the fiber is loosely contained by the tube and the tube comprises matrix of glass filaments with interstices between adjacent filaments filled with a rigid material holding the filaments in their relative positions in which the filaments extend side-by-side longitudinally of the tube.

With the structure according to the invention, the optical fiber is loosely contained within the protective tube so as to enable relative longitudinal movement of optical fiber and tube during flexing or bending of the cable while axial tension is not placed upon the fiber by the surface of the tube.

In addition, the protective tube in the construction of the invention has mechanical properties for protecting the optical fiber which are superior to those offered by a conventional protective tube.

Conventionally, protective tubes are formed from plastics which provide an inadequate tensile strength to protect the optical fibers against tensile loadings. Hence, in conventional cables some other method of providing the necessary tensile strength is required such as steel filaments extending longitudinally of the cable and lying exteriorly of the tubes. It is normal to provide the steel filaments in a jacket surrounding a protective tube or tubes. A steel sheath around a core of protective tubes may also provide the required tensile strength.

In the cable of the present invention, however, each longitudinally extending glass filament in the tube immediately surrounding the optical fiber is a tensile strength member. Hence, because the glass filaments are densely packed side-by-side, a protective tube of relatively small diameter in the cable of the invention may have a tensile strength comparable to and possibly exceeding the tensile strength of an optical cable of much larger diameter having a protective tube for optical fibers and steel strength members lying outside the tube, e.g. within the jacket. While an elastomeric jacket may be provided around a tube in the cable of the present invention, it follows that no tensile strength members are required either within the jacket or in any other location outside the tube. In a practical example of inventive cable which may dispense with the use of a jacket and steel sheath, the cable may consist of at least one optical fiber loosely contained within the protective tube having an outside diameter as small as 4.10 mm and an inside diameter of 1.70 mm.

In the protective tube of the inventive optical cable, there is preferably at least 70% of the tube volume in the form of glass filaments with the rigid material between the interstices providing the remainder of the tube volume. In one particularly practical example, the glass filaments occupies approximately 80% by volume of the protective tube and the rigid material occupies approximately 20% by volume.

The rigid material in the tube is preferably a thermosetting material such as a polyester or epoxy resin.

In a preferred arrangement, the inside of the protective tube unoccupied by the optical fiber is filled with a water blocking medium. This water blocking medium may be a viscous water blocking medium or is preferably a thixotropic water blocking medium.

One embodiment of the invention will now be described, by way of example, with reference to the accompanying drawings, in which.

Figure 1:
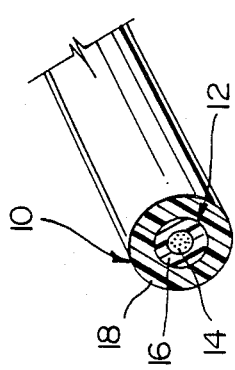
FIG. 1 is an isometric view of part of a cable according to the embodiment.

As shown in FIG. 1, an optical cable 10 has a core 12 comprising a plurality of optical fibers 14 housed within a protective tube 16. The core is surrounded by a dielectric jacket 18 which may be, for instance, a polyethylene based material.

Figure 2:
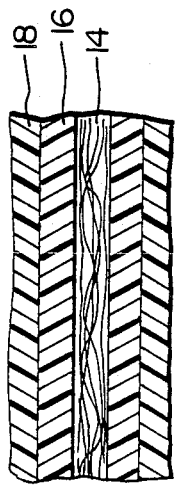
FIG. 2 is a cross-sectional view taken along the axis of the cable and on a larger scale than FIG. 1.

As can be seen from FIGS. 1 and 2, the optical fibers 14 have diameters substantially less than the inside diameter of the tube whereby the fibers are loosely contained within the tube even though there may be ten or more fibers in the cable.

The cable construction of this embodiment does not require a cable sheath or shield to protect the optical fibers as the tube 16 is capable of withstanding substantial tensile loads with insignificant strain. For the same reason, no tensile strength member outside the tube 16, such as steel filaments in the jacket are required. In the particular construction shown in FIG. 1, the cable is capable of being subjected to a tensile load of 600 lbs. while the tube 16 satisfactorily protects the fibers from such loading. The outside diameter of the cable of the embodiment is 6.5 mm and the tube, which acts as the strength member, has an outside diameter of 4.1 mm and an inside diameter of 1.7 mm.

Figure 3:
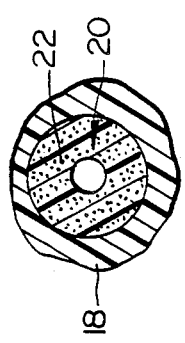
FIG. 3 is a cross-sectional view of the cable taken along line III—III in FIG. 2.

The tube 16 comprises a plurality of side-by-side and closely packed tensile glass filaments 20 which extend longitudinally of the tube and are embedded within a continuous solidified rigid carrier material 22 which occupy gaps between the filaments 20. The glass filaments 20 occupy at least 70% and preferably 80% by volume of the tube 16 with the remainder of the tube volume occupied by the carrier materials. This rigid carrier material is a polystyrene or polyester based resin. As can be seen from FIG. 3, the tensile glass filaments 20 lie in close side-by-side positions while extending longitudinally of the tube. The tube is capable of withstanding up to 600 lbs. tensile load, as has been indicated, and with a minimum strain which prevents tensile loads acting directly upon the fibers themselves. Because the tube also forms the tensile strength member of the cable, it is unnecessary to provide the cable with a metal sheath for tensile purposes or to provide tensile strength members such as steel filaments. Hence, the tube is simply surrounded by the jacket 18 which is provided solely to protect the tube from outside environmental conditions. Otherwise the jacket is not required.

The tensile glass filaments 20 extend substantially longitudinally of the tube so as to resist any extension of the cable caused by tensile loading such as may occur during bending or twisting of the cable as it is being installed or after installation. The tensile glass filaments are provided by, for instance, twenty-four groups of fibers with the groups closely positioned together and, in each group, there are a plurality of strands or rovings of the glass filaments.

The passage in the center of the tube 12 is filled by the optical fibers and a thixotropic water blocking medium which fills any spaces not occupied by the fibers.

Figure 4:
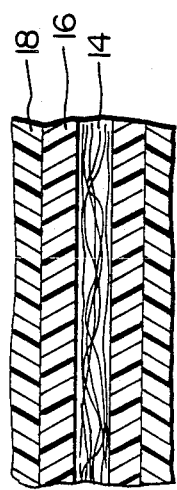
FIG. 4 is a diagrammatic side elevational view of apparatus according to the invention for making the cable of FIGS. 1 and 2.
Figure 5:
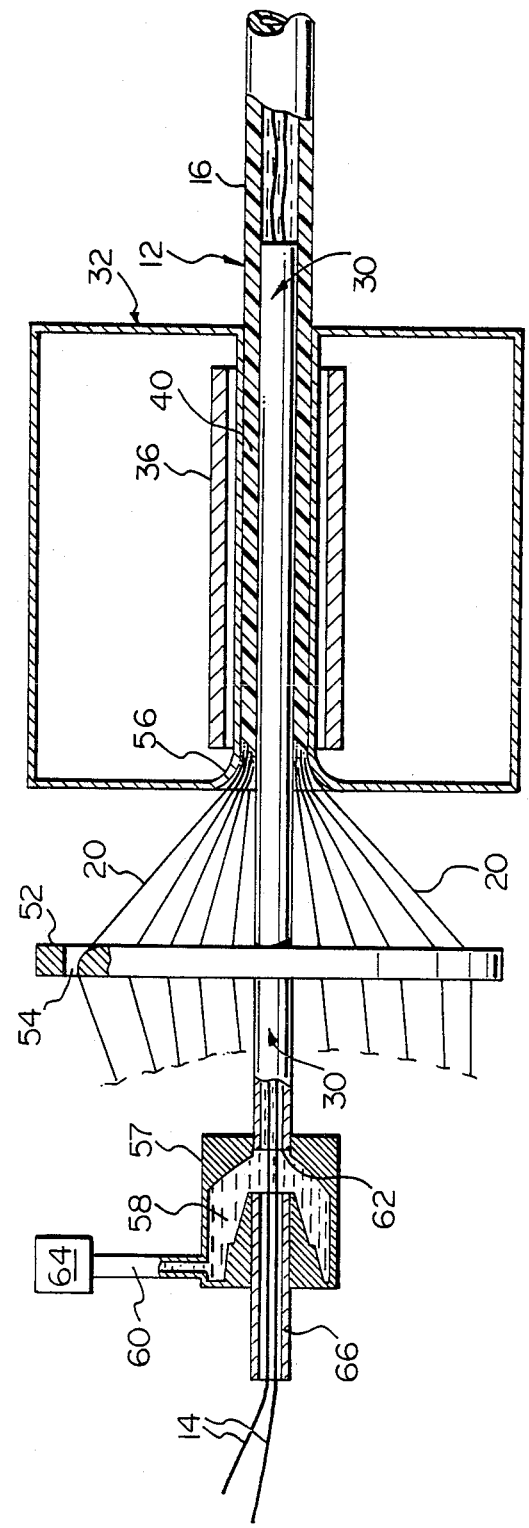
FIG. 5 is a view similar to FIG. 3 of a part of the apparatus on a larger scale.

The cable is made by the in-line apparatus shown in FIGS. 4 and 5. As can be seen, the apparatus comprises a reservoir 24 holding a bath 26 of the polystyrene or polyester based resin. Downstream along a passline for the groups of tensile glass filaments 20 is disposed a tube forming means 28. This tube forming means comprises a tubular guide means in the form of a stainless steel tube 30 which extends along the passline of the glass fibers and has a polished outer surface. Surrounding a downstream end portion of the tube 30 is a heating means 32 which comprises a housing 34 shrouding heating elements 36 which may be electrical. As can be seen from FIG. 4 the housing 34 has an inner cylindrical surface 38 which is polished and surrounds the downstream end portion of tube 30 while being spaced from it to define a tubular space 40 between the heating element and the tube 30.

Guide means is provided for holding the tensile glass filaments 20 in laterally spaced relationship as they pass through the reservoir 24, for disposing these groups of filaments in spaced apart positions around an arc concentric with the tube 30 and also for causing convergence of the groups of coated glass filaments towards an upstream inlet end 42 of the tubular space 40 to bring the groups of filaments into close relationship as they enter the space. This guide means comprises a plurality of side-by-side guide pulleys 44, one pulley for each of the groups of tensile filaments. In FIG. 4 only one of the guide pulleys 44 is shown as the guide pulleys 44 for all filament groups are in alignment in that Figure. From guide pulleys 44 to pulleys 50 lying downstream, the paths of all filament groups are in alignment, i.e. around pulleys 46 and 48 so that one only of each of these pulleys and of pulley 50 are shown in FIG. 4. The guide means also comprises a circular guide plate 52 through which the tube 30 passes at an upstream end portion of the tube. The guide plate 52 has a plurality of guide holes 54, i.e. one for each of the groups of tensile filaments and these holes are spaced apart around a pitch circle coinciding with the axis of the tube 30 in equally spaced positions around that axis. The guide means also comprises a leading chamfered edge 56 of the housing 34 (see FIG. 5) for smoothly contacting the tensile filaments as they move into the space 40.

The apparatus also comprises a means for introducing the water blocking thixotropic medium into the crush resistant tube 16. This means comprises an applicator 56 which comprises a housing mounted at the upstream end of the tube 30. The housing 56 defines passageways 58 from an inlet 60 to an outlet 62 of the housing to enable the thixotropic medium to be pumped through the inlet 60 from a source not shown, through the passages and out of the housing into the inlet of the tube 30. A pump 64 (see FIG. 5) is provided for pressurizing the thixotropic medium so that it is forced along the tube 30. The pump 64 is adjustable in speed to alter the pressure for a reason to be discussed below. At an upstream side of the housing 56 there is provided a concentric inlet tube 66 for admittance of the optical fibers 14 to enable the fibers to be fed into the tube 16 during its formation, as will now be described.

In use of the apparatus shown in FIGS. 4 and 5, the groups of tensile glass filaments 20 are mounted respectively upon individual reels 68 upstream of the reservoir 24. Also at the upstream end of the apparatus are disposed a plurality of spools 70, each spool wound with one of the optical fibers 14. The groups of tensile glass filaments 20 are fed around their respective pulleys 44, 46, 48 and 50. As the groups of filaments are passed through the bath 26, each individual glass filament becomes coated with the resin which is at room temperature. The groups of filaments then proceed from the bath around the pulley 50, and around any additional guiding pulleys which are required (not shown) to bring the groups through individual holes 54 in the guide plate 52 and form them into a circular array surrounding the tube 30. The groups then are caused to converge towards each other and towards the tube 30 so as to guide them into the tubular space 40. As the groups of filaments enter the tubular space 40, they lie in close relationship and the space 40 becomes filled with the filaments and the resin coating material which surrounds them.

The glass filaments and resin are drawn along their passlines and through space 40 by a cable reeler 71 and are caused to be molded within the space 40 into the solidified fiberglass tube 16 by the heating means 32 operating at the required temperature, in this case approximately 300° F., to solidify the resin before it leaves the space. The completely solidified tube thus moves downstream from within the heater 32.

During the movement of the groups of filaments in the above described manner along their passlines, the fibers 14 are passed from the spool 70 through the tube 66 and device 56 and into the entrance of the tube 30 as shown in FIG. 5. The thixotropic water blocking medium is passed into the passage 58 of the device 56 by the pump 64 so that it surrounds the fibers 14 and is forced in a downstream direction along the tube 30 and, upon leaving this tube, enters into the solidified tube 16. The flow of the thixotropic medium draws the optical fibers 14 from their spools 70 so as to move them into the tube 16 as the core is being manufactured. Thus the core is completely filled by the optical fibers and the water blocking medium.

It is desirable that each of the optical fibers has a greater axial length than the tube 16 into which it is being fed so that any bending of the tube 16, in use of the finished cable will merely tend to cause relative axial movement of the tube and fibers in the vicinity of the bend without placing the fibers in tension. To enable the length of each optical fiber to be greater than that of the tube, the pressure placed upon the filling medium is changeable by altering the speed of the pump 64 so that an increased flow of the medium will draw the optical fibers from their spools at a greater rate. This drawing action forces the optical fibers along the tube 30 at a greater speed than that of the tensile filaments through the space 40, whereby upon the optical fibers and water blocking medium emerging into the tube 16 at the downstream end of the guide means 30, the speed of the optical fibers and of the filling medium is reduced. This leads to a meandering of the optical fibers within the oversize passage of the tube 16 as illustrated by FIG. 2. The degree of this meandering may be controlled by the changing of the speed of the pump 64.

Upon the finished core 12 of the cable emerging from the apparatus 28, it then proceeds in in-line fashion through a cross-head 72 of an extruder (not shown) in which the core is provided with the surrounding jacket 18 to complete the cable 10.

As can be seen from the above embodiment, the cable structure is relatively simple in construction and avoids the necessity of using steel reinforcing members or a shield surrounding the fiberglass protective tube 16 for protection of the optical fibers during normal tensile loading conditions. It has been shown that the protective tube 16, because of its structure, is capable of withstanding significant tensile loads while protecting the optical fibers. The tube 16 has an inside diameter which is far in excess of that of the combined diameter of the optical fibers so that each of the fibers are radially movable within the tube. The optical fibers have axial lengths which are greater than that of the protective tube 16 whereby tensile loads placed upon the tube and finished cable which tend to stretch the cable will merely tend to straighten the fibers, as described, without placing them into tensile loaded conditions.

What is claimed is:

1. An optical cable having a plurality of optical fibers, a cable jacket and a tubular cable tensile strength member surrounding the plurality of fibers as a group, the tubular cable tensile strength member comprising a plurality of glass filaments with gaps between adjacent filaments filled by a rigid material holding the filaments in their relative positions in which the filaments extend side-by-side longitudinally of the cable, the glass filaments occupying more volume of the tube than is occupied by the rigid material, and the cable jacket extruded onto and contacting the tensile strength member with tensile strength member having an inner diameter greater than the combined diameters of the fibers of the group whereby each fiber is radially movable within the tube.

2. A cable according to claim 1 wherein the rigid carrier material is a thermosetting material such as an epoxy resin.

3. A cable according to claim 1 wherein the inside of the tube unoccupied by fiber is filled with a water blocking medium.

4. A cable according to claim 1 wherein the inside of the tube unoccupied by fiber is filled with a viscous water blocking medium.

5. A cable according to claim 1 wherein the inside of the tube unoccupied by fiber is filled with a thixotropic water blocking medium.

6. A cable according to claim 1 wherein the glass filaments occupy at least 70% by volume of the protective tube, the remainder of the volume of the tube occupied by the rigid material.

* * * * *